(12) United States Patent
Parish et al.

(10) Patent No.: US 6,244,803 B1
(45) Date of Patent: Jun. 12, 2001

(54) AIRCRAFT CARGO BARRIER NET

(75) Inventors: James M. Parish, Wadsworth; David E. Genovese, Peninsula; Ronald W. Phillips, II, Akron; John H. Sudekum, Sagamore Hills, all of OH (US)

(73) Assignee: SMR Technologies, Inc., Sharon Center, OH (US)

( * ) Notice: Subject to any disclaimer, the term of this patent is extended or adjusted under 35 U.S.C. 154(b) by 0 days.

(21) Appl. No.: 09/245,479

(22) Filed: Feb. 5, 1999

(51) Int. Cl.$^7$ .............................. B61D 45/00; B05D 63/00
(52) U.S. Cl. ......................... 410/97; 410/100; 24/68 CD
(58) Field of Search .................... 24/68 CD, 265 AL, 24/599.1, 600.9; 410/96, 97, 100, 117, 118; 87/12, 13; 244/118.1, 137.1

(56) References Cited

U.S. PATENT DOCUMENTS

| | | | |
|---|---|---|---|
| 188,101 | * | 3/1877 | Campbell ............................ 24/600.9 |
| 449,870 | * | 4/1891 | Buckingham et al. ............. 24/600.9 |
| 1,175,437 | * | 3/1916 | Grotz et al. ......................... 24/600.9 |
| 1,565,392 | * | 5/1925 | Powers ................................ 24/600.9 |
| 2,669,402 | * | 2/1954 | Del Mar . |
| 2,705,461 | * | 4/1955 | Campbell . |
| 3,173,539 | * | 3/1965 | Looker . |
| 3,268,967 | * | 8/1966 | Jordan ................................. 24/600.9 |
| 3,486,723 | * | 12/1969 | Harrison . |
| 3,897,919 | * | 8/1975 | Weingarten . |
| 3,961,585 | * | 6/1976 | Brewer . |
| 4,017,946 | * | 4/1977 | Soja ............................... 24/265 AL |
| 5,193,955 | * | 3/1993 | Chou . |
| 5,234,074 | * | 8/1993 | Bell ........................................ 182/9 |
| 5,375,528 | * | 12/1994 | Brinkman ............................ 102/331 |
| 5,440,790 | * | 8/1995 | Chou . |
| 5,458,447 | * | 10/1995 | Clason . |
| 5,669,118 | * | 9/1997 | Frano et al. ...................... 24/265 AL |

FOREIGN PATENT DOCUMENTS

965771 * 9/1950 (FR) .

OTHER PUBLICATIONS

Excerpts from an Air Cargo Equipment Catalog (4 pages) (undated).

* cited by examiner

*Primary Examiner*—D. Glenn Dayoan
*Assistant Examiner*—Scott Carpenter
(74) *Attorney, Agent, or Firm*—Renner, Kenner, Greive, Bobak, Taylor & Weber

(57) ABSTRACT

A cargo barrier net (10) is preferably made of a high-strength, lightweight, low-elongation material such as a material sold under the trademark KEVLAR®, and includes straps (11, 13) intersecting at intersections (15) at varying angles. A stitching pattern (20) is applied at each intersection (15) which is configured so that it will not fail irrespective of the direction of the force applied to the intersection (15). A hook (16) is releasably attached to some of the ends of the straps (11, 13) to attach portions of the periphery of the net (10) to the aircraft. A bracket (17) is releasably attached to some of the ends of the straps (11, 13) to attach other portions of the periphery of the net (10) to the aircraft. At least some of the straps (11) are interrupted and a link (18) is provided to selectively join the interrupted ends of the straps (11). The net (10) may thus be quickly removed to load and unload the cargo by releasing the hooks (16) and operating the links (18) to interrupt the net (10). In addition, the straps (11, 13) may be easily removed from the hooks (16) and brackets (17) when the straps (11, 13) need to be replaced.

34 Claims, 5 Drawing Sheets

AIRCRAFT CARGO BARRIER NET

TECHNICAL FIELD

This invention relates to a barrier net to restrain cargo positioned in an aircraft or the like. More particularly, this invention relates to such a net which is lightweight, but strong, and which is provided with a variety of unique hardware items to attach the net to the interior of the aircraft.

BACKGROUND ART

Cargo barrier nets which restrain cargo carried in an aircraft are known in the art. Such are particularly prevalent in freighter aircraft, which have been converted from passenger aircraft, to prevent the intrusion of cargo into the crew area in the event of a severe forward load on the aircraft. Most of these known nets are fabricated of high-elongation materials such as nylon or polyester strap webbing. However, such materials are quite heavy, having a low strength-to-weight ratio. In order to add strength to these nets, additional strands of webbing to resist stretching are required, but such only compounds the weight problems already existent in these nets. As such, most manufacturers allow maximum stretching of these nets which has the disadvantage of not being able to utilize all available space for cargo, the space rather being used to accommodate the stretching of the net.

A net woven of thread sold under the trademark KEVLAR® would be a solution to the aforementioned problems in that this material is lighter weight, having a much higher strength-to-weight ratio, and exhibits a very low stretch at failure. However, to date, no one has been able to develop a cargo barrier net of KEVLAR® in that fabricating such a net with sufficient accuracy to prevent unbalanced loads on individual web members is extremely difficult. Thus, the need exists for a cargo barrier net fabricated of a high strength-to-weight ratio material such as KEVLAR®.

The webbing or straps which form cargo barrier nets, fabricated of any known material, usually intersect at approximately right angles and are conventionally box stitched or otherwise attached at their intersection. However, for high strength-to-weight materials, such as KEVLAR®, such attachment could well represent areas for failure, and known stitching would not accommodate other than right angle intersections.

In addition, the hardware utilized to attach the periphery of prior art cargo barrier nets to the aircraft is not without its problems. Such hardware is quite heavy and expensive and has, in the past, been permanently attached to the fabric. As such, when the fabric wore out or otherwise failed and had to be replaced, either the hardware had to be replaced as well or the hardware had to be cut off the fabric, sent back to the manufacturer, and reattached to the new fabric. Moreover, the fabrication of a net with the hardware attached thereto is much more difficult in that the hardware adds significant weight to the already heavy fabric, rendering the maneuverability of the net during the fabrication thereof and subsequent unwieldy shipment thereof expensive.

Finally, for loading and/or unloading cargo on an aircraft, at least the top, bottom and one side of the peripheral net attachments must be disconnected from the aircraft and then reattached when the cargo is in place. When utilizing a material for the net having a high strength-to-weight ratio, because there is minimal elongation at load, the net must be fabricated to be preformed in the shape of its loaded condition so that any force thereon is in the longitudinal direction of the aircraft. Thus, the top net attachments are not readily within reach and therefore, when using these materials, an alternative and simpler manner of moving the net out of the way of the cargo being loaded and/or unloaded is required.

In short, the need exists for a lightweight, high strength aircraft cargo barrier net. But in order to accomplish such, specialized attachment of the intersecting webbing as well as unique hardware devices is desirable, if not required.

DISCLOSURE OF THE INVENTION

It is therefore an object of the present invention to provide a cargo barrier net for an aircraft which is fabricated of a lightweight, low-stretch material having a high strength-to-weight ratio.

It is a further object of the present invention to provide a cargo barrier net, as above, which enables the maximum amount of cargo space in the aircraft to be utilized.

It is another object of the present invention to provide a cargo barrier net, as above, in which the intersections of the webbings or straps forming the net are not all at ninety degrees.

It is an additional object of the present invention to provide a cargo barrier net, as above, in which the intersections of the webbings are provided with a unique stitching pattern to provide omnidirectional strength to the net at those intersections.

It is yet another object of the present invention to provide a cargo barrier net, as above, in which the fabric may be replaced without replacing the hardware which attaches the periphery of the fabric to the aircraft.

It is still another object of the present invention to provide a cargo barrier net, as above, which is easy to manufacture.

It is yet another object of the present invention to provide a cargo barrier net, as above, in which the hardware is easy to utilize to attach the net to the aircraft.

It is a still further object of the present invention to provide a cargo barrier net, as above, with a connecting link between the top and bottom of the net to enable cargo to be placed in or removed from the aircraft without having to disconnect the top of the net from the aircraft.

It is a yet further object of the present invention to provide a cargo barrier net, as above, in which the link can be operated with one hand and provides a visual indication as to whether it is in an open or closed position.

These and other objects of the present invention, which will become apparent from the description to follow, are accomplished by the improvements hereinafter described and claimed.

In general, a net made in accordance with the present invention includes a plurality of spaced first straps intersecting with a plurality of spaced second straps. The intersections of the straps are at a plurality of angles relative to each other. A stitching pattern is applied to the straps at the intersection to connect the first and second straps. The stitching pattern includes a plurality of lines of stitches oriented such that at least one of the stitch lines will be approximately normal to the direction of any force applied to any intersection.

In accordance with another aspect of the present invention, a net includes a plurality of straps having ends. A hook member is attached to a plurality of the ends and includes a hook assembly adapted to be attached to a portion of an aircraft or the like. A slide member carries an end of each strap and is moveable relative to the hook member to allow the end of the strap to be removed from the slide member.

In accordance with a further aspect of the present invention, a net includes a plurality of straps having ends and a bracket member is attached to a plurality of the ends. Each bracket member includes a plate assembly adapted to be attached to a portion of an aircraft or the like, and a pivot member which is moveable relative to the plate assembly to allow the end of the strap to be removed from the pivot member.

In accordance with yet another aspect of the present invention, a net includes a plurality of straps, some of which are interrupted to form opposed interrupted ends. A releasable link member is provided to selectively join the interrupted ends.

A preferred exemplary cargo barrier net incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
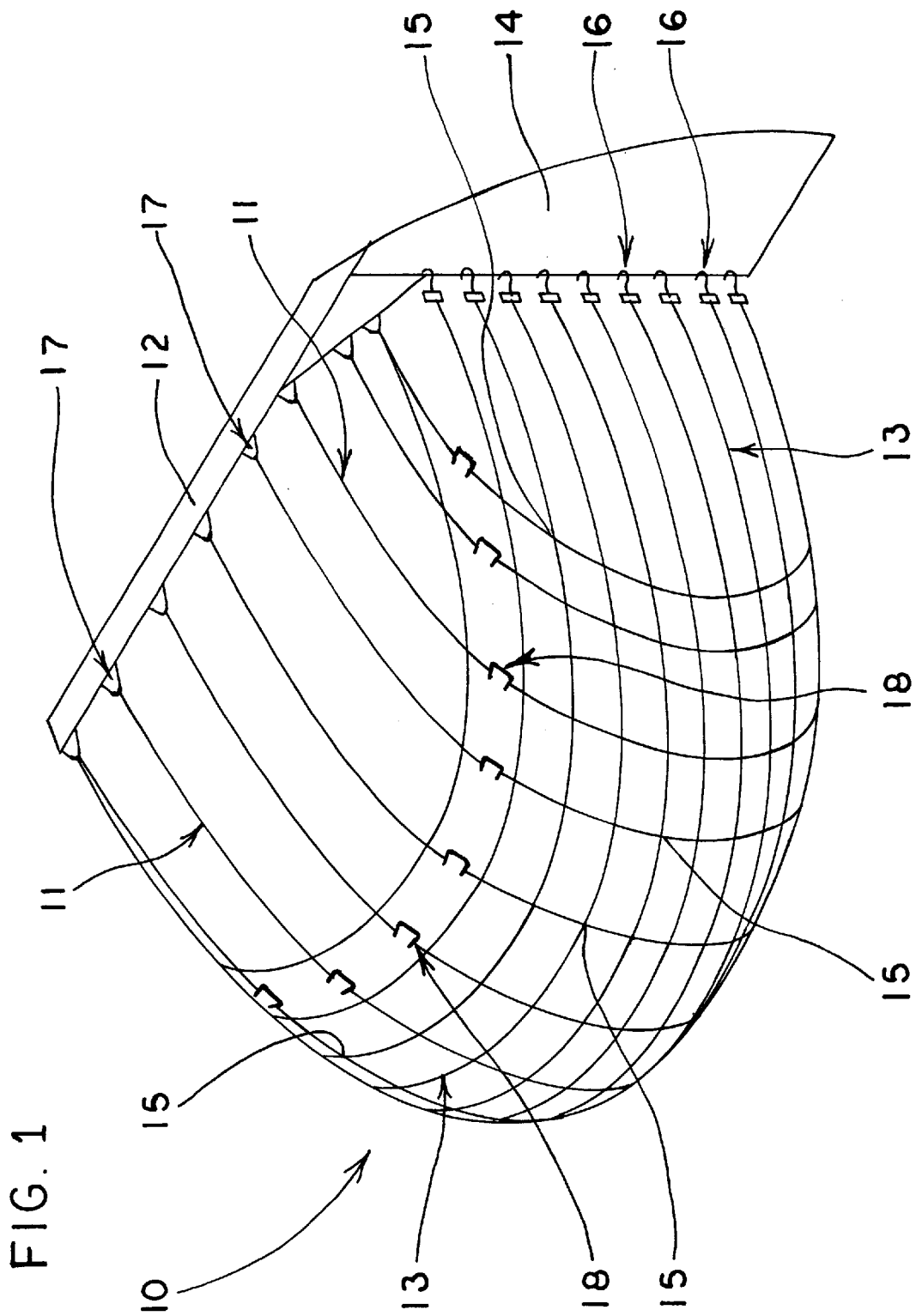
FIG. 1 is a schematic representation of a loaded cargo barrier net made in accordance with the present invention and attached to an aircraft.

A cargo barrier net made in accordance with the concepts of the present invention is schematically shown in FIG. 1 and indicated generally by the numeral 10. Net 10 is shown in a loaded condition, as if cargo were bearing against it, and includes a plurality of laterally spaced webbing components, generally indicated by the numeral 11, usually in the form of woven straps, extending between the top 12 of an aircraft to the floor thereof, thus extending in a generally vertical direction. Net 10 also includes a plurality of vertically spaced webbing components, generally indicated by the numeral 13, also usually in the form of woven straps, extending from one side of the aircraft, such as from a bulkhead 14, to the other side thereof, thus extending in a generally horizontal direction. As such, net 10 includes a plurality of intersections 15 of straps 11 and 13.

Net 10 also includes a plurality of hardware components such as hooks generally indicated by the numeral 16, brackets generally indicated by the numeral 17, and intermediate links generally indicated by the numeral 18. As will hereinafter be described in more detail, hooks 16 are preferably utilized to attach straps 13 to one side 14 of the aircraft (the side nearest the door thereof), and to attach straps 11 to the floor of the aircraft. Brackets 17 are preferably utilized to attach straps 11 to the top 12 of the aircraft and to attach straps 13 to the other side of the aircraft. The generally vertically oriented straps 11 are preferably interrupted and joined by links 18 as will be hereinafter discussed. For reasons of strength, hooks 16, brackets 17 and links 18 are preferably formed of a titanium or like material.

Straps 11 and 13 are preferably woven of a highstrength, lightweight, low-elongation material such as threads sold under the trademark KEVLAR®. Rather than forming KEVLAR® net 10 in a flat configuration, it is preferably somewhat preformed in the loaded configuration shown in FIG. 1 because of the minimal elongation that will take place upon load. As such, the intersections 15 of KEVLAR® straps 11 and 13 are not all at the traditional right angles to each other. Rather, dependent on the particular location of an intersection 15, the angle of intersection could vary, typically from approximately forty-five degrees to ninety degrees.

Figure 2:
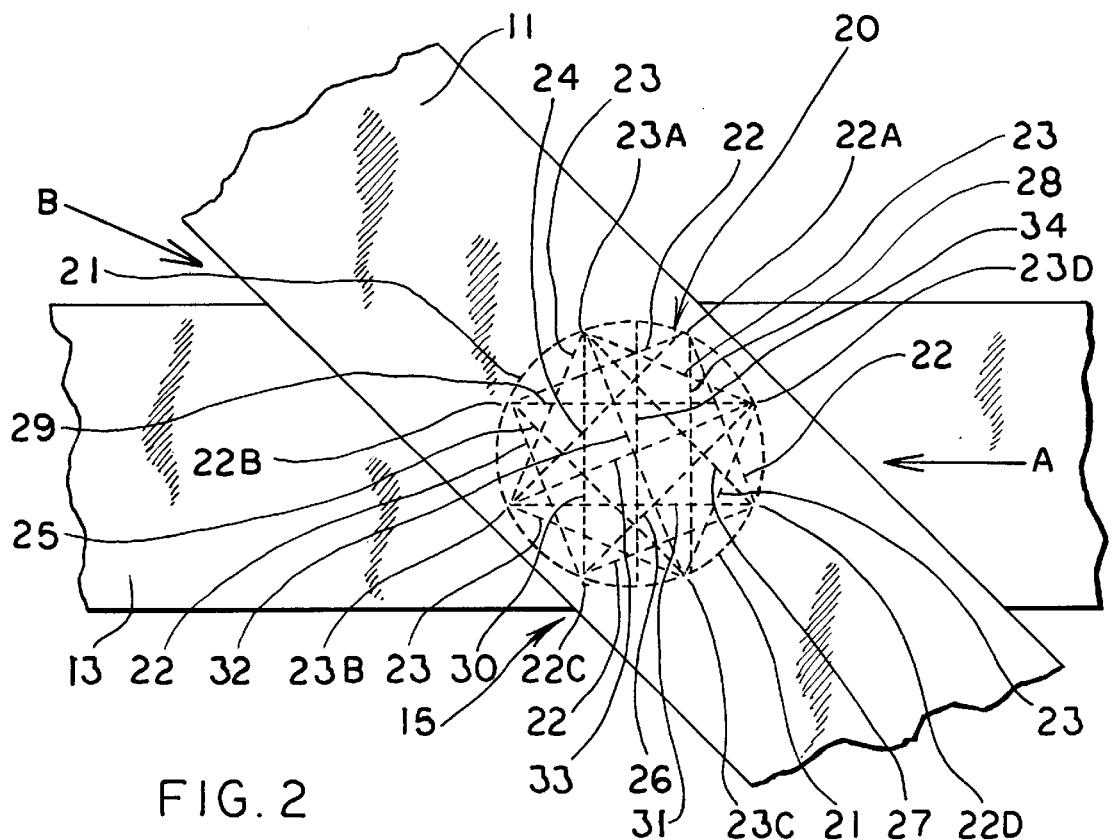
FIG. 2 is a fragmented elevational view of an intersection of the strap webbing of the cargo barrier net and showing a stitching pattern for the connection of the intersecting straps.

One typical intersection 15 is shown in FIG. 2. Straps 11 and 13 are attached to each other by a unique stitching pattern indicated generally by the numeral 20. The same stitching pattern 20 can conveniently be used at each intersection of straps 11 and 13 irrespective of the angle of that intersection. Moreover, as now will be described in detail, each stitching pattern 20 is such that it will not fail irrespective of the direction of the force applied to it when net 10 is under load.

Each stitching pattern 20 includes an outer circular pattern of stitches 21 and two rectangular patterns of stitches 22 and 23 positioned within circular stitch pattern 21. Rectangular stitch patterns 22 and 23 are oriented forty-five degrees of each other and have their corners 22A, 22B, 22C, 22D and 23A, 23B, 23C, 23D touching circular pattern stitch 21. A plurality of other lines of stitches extend between various of these corners, as follows: A stitch line 24 extends between corner 22A and corner 23B, a stitch line 25 extends between corner 22B and corner 23C, a stitch line 26 extends between corner 22C and corner 23D, a stitch line 27 extends between corner 22D and corner 23A, a stitch line 28 extends between corner 22A and corner 23C, a stitch line 29 extends between corner 22B and corner 23D, a stitch line 30 extends between corner 22C and corner 23A, a stitch line 31 extends between corner 22D and corner 23B, a stitch line 32 extends between corner 23A and corner 23C, and a stitch line 33 extends between corner 23B and corner 23D. In addition, a final stitch line 34 extends diametrically across circular stitch pattern 21 and through opposed intersections of rectangular stitch patterns 22 and 23.

Rather than merely failing under sever load, as is the case in the prior art dependent on the direction of the load, stitching pattern 20, as just described, will support an initial minimum design load without stitch failure, and then if the load increases up to a maximum design load, will allow certain stitches to fail, but will stop a total failure of the stitched intersection 15 irrespective of the direction of the force. For example, if the force were coming along strap 13 from the right of FIG. 2 toward intersection 15 (arrow A), first, circular stitch pattern 21 would begin to fail and strap 11 would begin to peel away from strap 13. Portions of two stitch lines of rectangular stitch patterns 22, 23, and stitch lines 26, 27, 39, 31, and 33 would then begin to fail, at the area to the right of stitch line 28 (as viewed in FIG. 2) until stitch line 28 is encountered. However, because stitch line 28 runs in a direction approximately normal to, or approximately lateral of the force, it will stop further peeling of strap 11 from strap 13.

As another example, if a force on intersection 15 which exceeded the minimum design load were coming in the direction of arrow B in FIG. 2, portions of circular stitch pattern 21, portions of two stitch lines of rectangular stitch pattern 22, and the portions of stitch lines 25 and 29 at the area to the left (as viewed in FIG. 2) of the stitch line between corners 23A and 23B would fail until that stitch line 23 was encountered. That stitch line 23 would then support the load up to the maximum design load.

Thus, because of the configuration of stitch pattern 20, there will always be some stitch line which extends in a direction approximately ninety degrees of the force to prohibit the stitch pattern 20 from total failure. Moreover, circular stitch pattern 21 has the additional function of preventing any initial failure of any stitch pattern 20 during casual handling of net 10, that is, circular stitch pattern 21 guards against the start of any failure under low loads.

Figure 3:
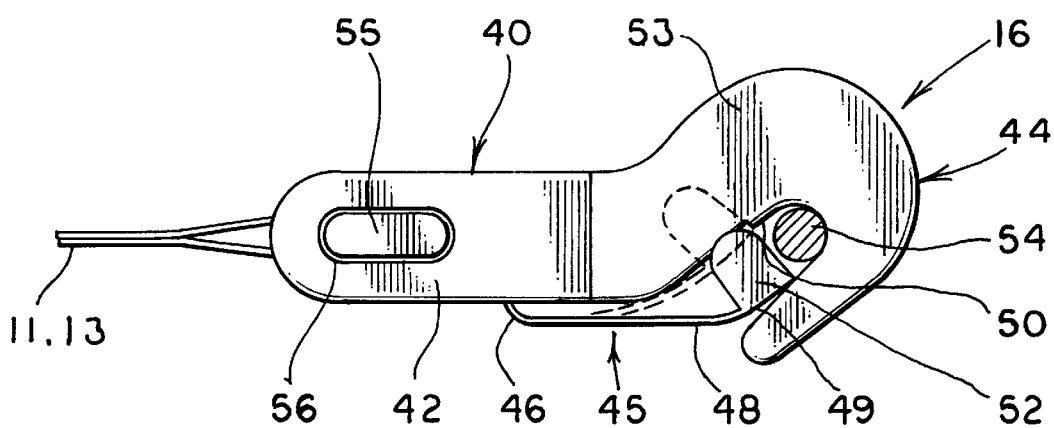
FIG. 3 is a fragmented elevational view of a hook hardware component which preferably attaches the cargo barrier net to the floor and one side of the aircraft.
Figure 4:
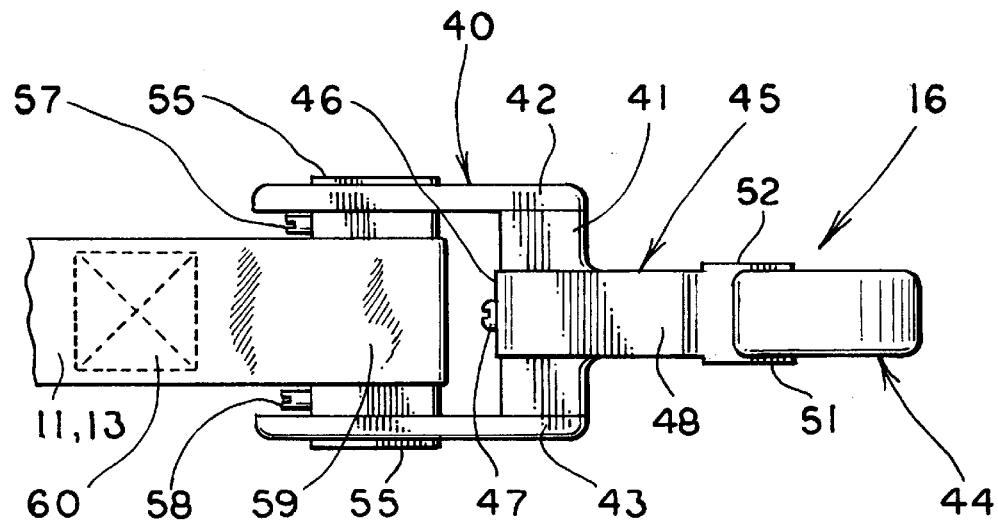
FIG. 4 is a bottom plan view of the hook hardware component shown in FIG. 3.
Figure 5:
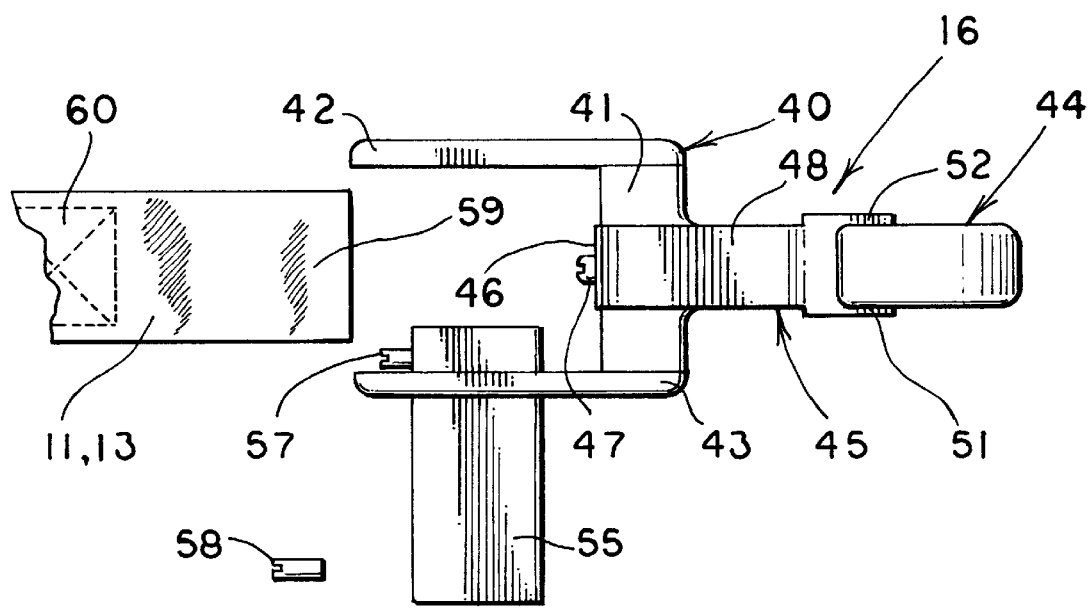
FIG. 5 is a view similar to FIG. 4 but showing the manner in which the strap webbing may be disconnected from the hook hardware component.

As previously described, hooks 16 are used to attach one end of straps 11 to the floor of the aircraft and one end of straps 13 to the side 14 of the aircraft, preferably the side which is nearest the cargo door. For reasons that will be hereinafter discussed, hooks 16 are designed to be quickly attached or detached from the aircraft, and are also easily detached from straps 11 and 13. As shown in FIGS. 3–5, each hook 16 includes a U-shaped frame, generally indicated by the numeral 40, which includes a base portion 41 and opposed branches 42, 43 extending rearwardly therefrom. A hook portion, generally indicated by the numeral 44, extends forwardly from base portion 41 and is formed integrally therewith. A retaining clip, generally indicated by the numeral 45, is preferably formed of a spring steel or equivalent material and includes a base member 46 attached to the rear side of base portion 41 between branches 42 and 43, as by rivets, bolts, or the like, as at 47. A spring arm 48 extends forwardly from base member 46 and at its outer end, arm 48 turns inwardly, as at 49, into the jaw 50 of the hook portion 44. Arms 51, 52 extend upwardly from the outer end 49 of spring arm 48 and are adapted to straddle the body portion 53 of hook portion 44.

To attach hook 16 to a rod 54 or other device positioned on the floor and on one side of the aircraft, the user merely allows rod 54 to begin to enter hook jaw 50 by moving hook portion 44 downwardly over rod 54. Such moves retaining clip 45 to the dotted line position shown in FIG. 3, and rod 54 is allowed to move completely into jaw 50, as also shown in FIG. 3. At this point, clip 45 has moved back to the solid line position to confine rod 54 within jaw 50. To remove hook 16, one need only pivot retaining clip 45 to the dotted line position shown in FIG. 3 and lift hook 44 to remove rod 54 from jaw 50.

Each hook 16 includes a fabric-engaging slide member 55, each end of which is received in a slot 56 formed in each branch 42 and 43. Slide member 55 receives a set screw 57, positioned just inwardly of branch 42, and another set screw 58, positioned just inwardly of branch 43. When in place, set screws 57 and 58 prevent slide member 55 from moving through slots 56. The ends of selected straps 11 and 13 are looped around slide member 55, with the loop 59 being maintained by a box stitch 60. If desired, loop 59 may be lightly stitched to slide member 55 by providing small through holes (not shown) in the titanium slide member 55.

Straps 11 and 13 are thus releasably carried by hook 16, and when the fabric or a hook 16 needs to be replaced, such can easily be accomplished without having to cut the fabric off of hooks 16 or otherwise return the hooks 16 to the manufacturer for assembly. To that end, one need only remove one of the set screws 57 or 58 and translate slide member 55 through one of the slots 56 to allow loop 59 to be removed from slide member 55. Thus, as shown in FIG. 5, by removing, for example, set screw 58, slide member 55 can be slid through slot 36 of branch 43 to the position shown in FIG. 5 wherein loop 59 can be removed from slide member 55. If loop 59 had been lightly stitched to slide member 55, that stitching can be easily broken.

As previously described, brackets 17 are also provided to attach the other two peripheral sides of net 10, not attached by hooks 16, to the aircraft. Such provides a more permanent attachment of net 10 to the top 12 of the aircraft and the side of the aircraft opposite to the door. As will hereinafter be discussed, a more permanent attachment can be provided at these locations since they will not have to be disconnected when loading or unloading cargo.

Figure 6:
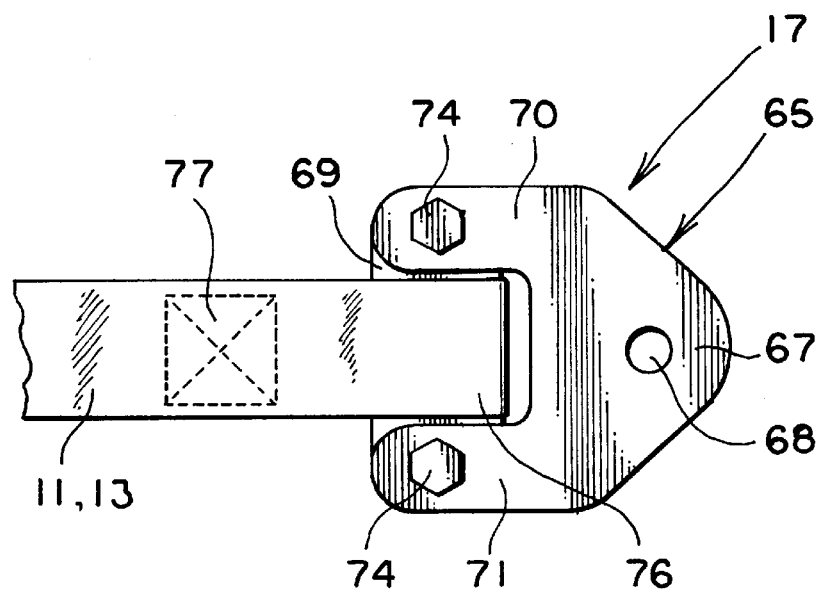
FIG. 6 is a top plan view of a bracket hardware component which is preferably utilized to attach the cargo barrier net to the top and one side of the aircraft.
Figure 7:
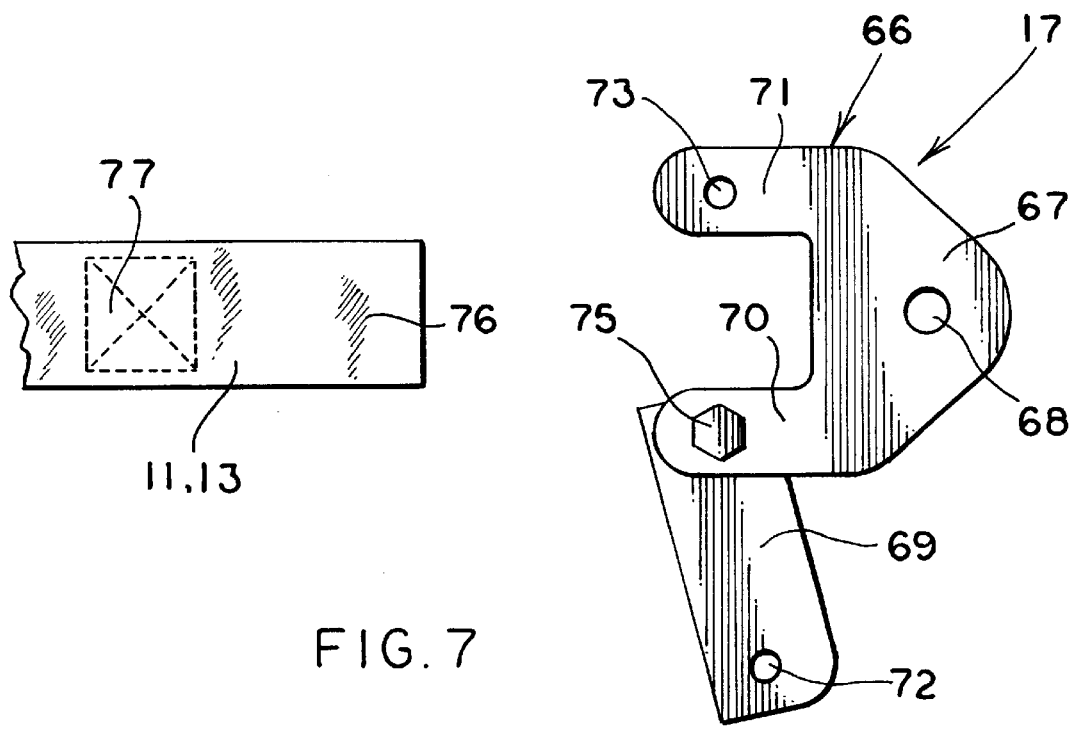
FIG. 7 is a bottom plan view of the bracket shown in FIG. 6 and showing the manner in which the strap webbing may be disconnected from the bracket hardware component.

As shown in FIGS. 6 and 7, each bracket 17 includes an upper generally U-shaped plate, generally indicated by the numeral 65, vertically spaced from a lower, generally U-shaped plate, generally indicated by the numeral 66. Plates 65 and 66 thus generally form a clevis to receive a mounting member (not shown) extending outwardly from the top and one side of the aircraft. The base 67 of each plate 65, 66 is provided with an aperture 68 therethrough, which apertures 68 are aligned with an aperture in the aircraft mounting member so that bracket 17 can be attached to the mounting member as by a bolt (not shown).

A fabric-holding pivot member 69 is received in the vertical space between the branches 70, 71 of U-shaped plates 65 and 66. Pivot member 69 includes apertures 72 (not shown) which are aligned with apertures 73 (one shown) formed in branches 70 and 71. Bolts 74 extend through apertures 72 and 73 and, together with engaging nuts 75, maintain pivot member 69 in the position shown in FIG. 6. The ends of the selected straps 11 and 13 are looped around pivot member 69, with the loop 76 being maintained by a box stitch 77. If desired, loop 76 may be lightly stitched to pivot member 69 by providing small through holes (not shown) in the titanium pivot member 69.

Straps 11 and 13 are thus releasably carried by bracket 17, and when the fabric or a bracket 17 needs to be replaced, such can easily be accomplished without having to cut the fabric off of brackets 17, without having to remove brackets 17 from the aircraft, or without otherwise having to return the brackets 17 to the manufacturer for assembly. To that end, one need only loosen and remove one of the bolts 74 so that member 69 may be pivoted on the other bolt 74 to the position shown in FIG. 7 at which point loop 75 can be removed from pivot member 69. If loop 75 had been lightly stitched to pivot member 69, that stitching can be easily broken.

When loading and unloading cargo, nets of the prior art had to be removed from the top, floor and one side (adjacent to the cargo door), and the net could then be peeled to the side to provide access to the cargo hold. However, the top connections are often difficult to reach, and such is particularly the case when net 10 is somewhat preformed in a loaded configuration, as is preferred in the present invention. As such, it is preferable not to be required to remove net 10 from the top of the aircraft to load and unload cargo.

Figure 8:
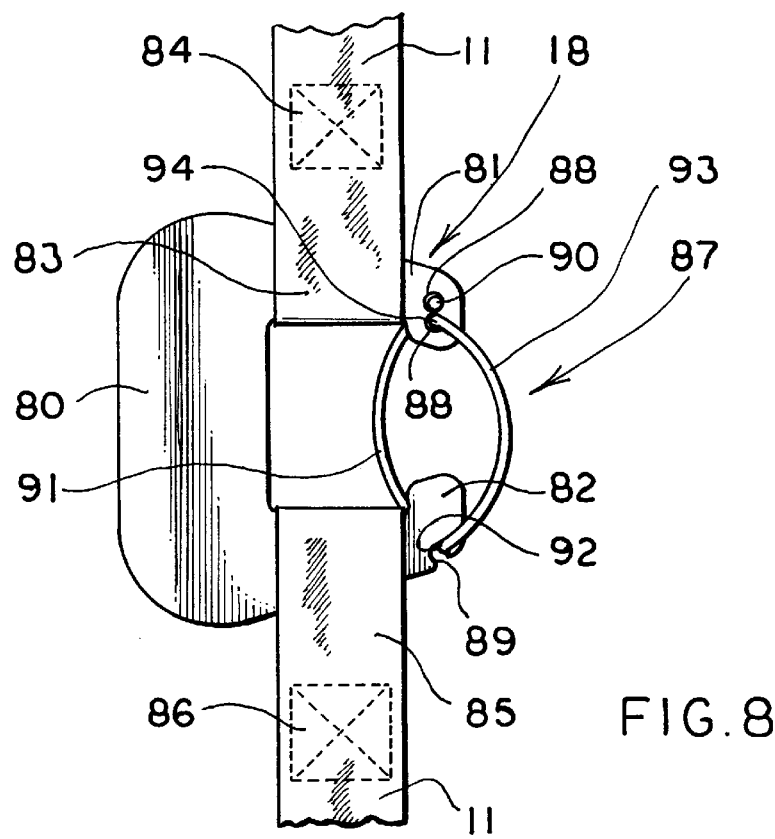
FIG. 8 is a fragmented elevational view of a link hook positioned between the top and bottom of the cargo barrier net and shown in a closed, locked position.
Figure 9:
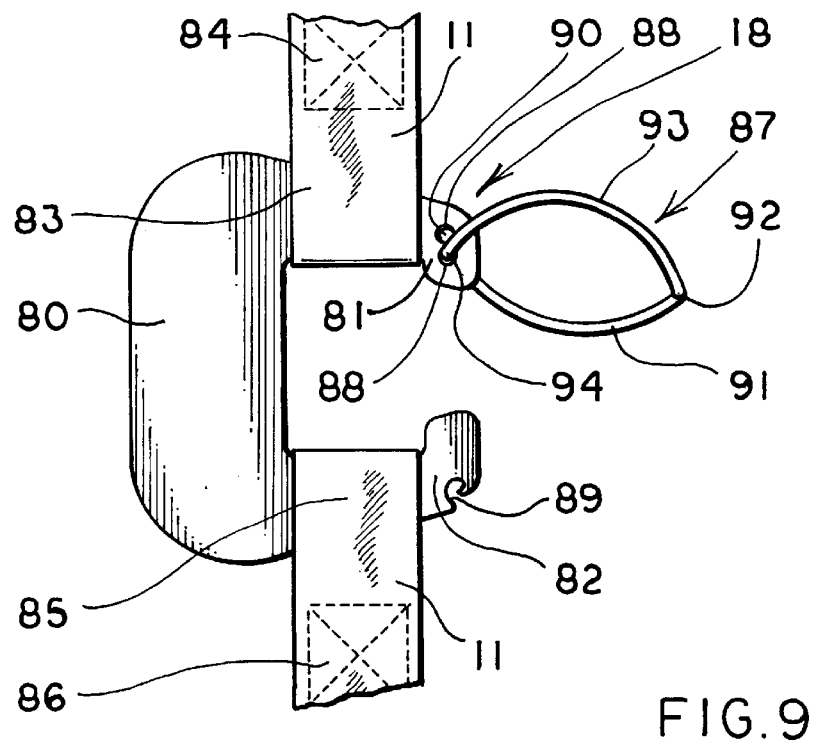
FIG. 9 is a view similar to FIG. 8 but showing the link hook in an open position whereby the strap webbing may be removed therefrom.

To that end, vertical straps 11 are interrupted at a location generally midway thereof, and links 18 are provided at that location. As shown in FIGS. 8 and 9, each link 18 includes a generally U-shaped body member 80 having spaced upper and lower arms 81 and 82, respectively. The strap 11 coming from the top of the aircraft has a loop 83 formed at the interrupted end thereof which is maintained by a box stitch 84. Loop 83 is received around upper arm 81 of link 18 and may be lightly stitched to arm 81 by providing small through holes (not shown) in the titanium arm 81. Similarly, the strap 11 coming from the floor of the aircraft has a loop 85 formed at the interrupted end thereof which is maintained by a box stitch 86. Loop 85 is received around lower arm 82 of link 18.

A spring steel spring, generally indicated by the numeral 87, is adapted to extend between the outer ends of arms 81 and 82 to maintain each link 18 closed. Vertically offset apertures 88 are formed near the end of arm 81, and a latch hook 89 is formed near the outer end of the bottom of lower arm 82. Each spring 87 is formed as a continuous wire starting as a lateral portion 90, adapted to be positioned in upper aperture 88 and then extending downwardly, behind arms 81 and 82, as viewed in FIG. 8, as a curved portion 91. The bottom of curved portion 91 is provided with a laterally extending latch section 92 which is adapted to be received in latch hook 89. Spring 87 then continues as a second curved portion 93 which is laterally spaced from curved portion 91 and which extends upwardly, in front of arms 81 and 82 as viewed in FIG. 8. Spring 87 then terminates as a lateral portion 94 which is positioned in lower aperture 88.

In the operating condition of net 10, all links 18 are closed with latch section 92 of spring 87 being received within and held by latch hook 89. When it is desired to load or unload cargo, hooks 16 are disengaged from the bulkhead 14 and from the floor of the aircraft, but instead of disengaging net 10 from the top of the aircraft, links 18 may be operated to separate vertical straps 11. To that end, with one hand the user may merely squeeze curved portions 91 and 93 of spring 87 toward each other which slightly elongates spring 87. This action, coupled with a slight downward and outward movement of spring 87, removes latch section 92 from latch hook 89, and upon the manual release of spring 87, it moves to its relaxed position extending laterally outwardly from net 10, as shown in FIG. 8. The lower portion of straps 11 may then be removed from arm 82 of link 18, and the lower half of net 10 can be peeled away for access to the cargo hold. The upper portion of straps 11 will remain in place and may be supported from sagging onto the cargo loaders by an arch-like frame (not shown) or the like positioned under the upper portions of straps 11.

When the loading/unloading process is completed, upper and lower strap portions are readily reunited by merely repositioning loop 85 over arm 82 and rotating each spring 87 downwardly until latch section 92 snaps into latch hook 89. It should be appreciated that because springs 87 extend laterally outwardly from net 10 when in the open position, the user is provided with a visual indication that a link 18 may still be open, which indication would not be available if, for example, the design and mounting of spring 87 were such that it hung by gravity downwardly in the relaxed position.

In view of the foregoing, it should be evident that a cargo barrier net constructed as described herein accomplishes the objects of the present invention and otherwise substantially improves the art.

What is claimed is:

1. A net comprising first spaced straps, and second spaced straps, said first and second straps intersecting at a plurality of angles relative to each other at a plurality of intersections; and a stitching pattern applied to said straps at said intersections to connect said first and second straps, said stitching pattern including a plurality of stitch lines oriented such that at least one of said lines of stitches will be approximately normal to the direction of any force applied to any of said intersections.

2. A net according to claim 1 wherein said plurality of stitch lines includes two rectangular stitch patterns angularly oriented relative to each other.

3. A net according to claim 2 wherein said stitching pattern includes a circular stitch pattern surrounding said two rectangular stitch patterns.

4. A net according to claim 2 wherein said rectangular stitch patterns have corners and said plurality of stitch lines includes a plurality of individual stitch lines extending between selected corners of said rectangular stitch patterns.

5. A net according to claim 1 wherein said straps are formed of a high-strength, lightweight, low-elongation material.

6. A net according to claim 1 wherein said plurality of angles fall within a range of forty-five degrees to ninety degrees of each other.

7. A net according to claim 1, the net being adapted to be attached to a structure, wherein said straps have ends, and further comprising a hook assembly attached to a plurality of said ends; each said hook assembly including a hook member adapted to be attached to the structure, and a slide member carrying a said end of said strap, said slide member being moveable relative to said hook member to allow said end of said strap to be removed from said slide member.

8. A net according to claim 7 further comprising a bracket member attached to a plurality of said ends; each said bracket member including a plate assembly adapted to be attached to the structure, and a pivot member carrying a said end of a said strap, said pivot member being moveable relative to said plate assembly to allow said end of said strap to be removed from said pivot member.

9. A net according to claim 1, the net being adapted to be attached to a structure, wherein said straps have ends, and further comprising a bracket member attached to a plurality of said ends; each said bracket member including a plate assembly adapted to be attached to the structure, and a pivot member carrying a said end of a said strap, said pivot member being moveable relative to said plate assembly to allow said end of said strap to be removed from said pivot member.

10. A net according to claim 9 wherein at least some of said straps are interrupted to form opposed interrupted ends, and further comprising releasable link members for selectively joining said interrupted ends.

11. A net according to claim 1 wherein at least some of said straps are interrupted to form opposed interrupted ends, and further comprising releasable link members for selectively joining said interrupted ends.

12. A net according to claim 11 the net being adapted to be attached to a structure, wherein said straps have ends, and further comprising a hook assembly attached to a plurality of said ends; each said hook assembly including a hook member adapted to be attached to the structure, and a slide member carrying a said end of said strap, said slide member being moveable relative to said hook member to allow said end of said strap to be removed from said slide member.

13. A net adapted to be attached to a structure comprising a plurality of straps, each of said straps having ends; a bracket member attached to a plurality of said ends; each said bracket member including a plate assembly adapted to be attached to the structure, and a pivot member carrying a said end of a said strap, said pivot member being moveable relative to said plate assembly to allow said end of said strap to be removed from said pivot member; and a hook assembly attached to a plurality of said ends; each said hook assembly including a hook member adapted to be attached to the structure, and a slide member carrying a said end of a said strap, said slide member being moveable relative to said hook member to allow said end of said strap to be removed from said slide member.

14. A net according to claim 13 wherein said hook assembly includes a generally U-shaped frame having a base and opposed branches extending therefrom.

15. A net according to claim 14 wherein said hook member extends outwardly from said base in a direction opposite to said branches.

16. A net according to claim 14 wherein a slot is formed in said branches of said frame, said slide member being received in said slots.

17. A net according to claim 16 further comprising a set screw received by said slide member near each end thereof adjacent to each said branch of said frame, and between said branches of said frame, said set screws maintaining said slide member in said first position.

18. A net according to claim 13, said hook member including a jaw to engage the structure, and a retaining clip carried by said hook member and received in said jaw.

19. A net according to claim 18 wherein said retaining clip includes a spring arm so that said retaining clip can be moved out of said jaw.

20. A net according to claim 13, the structure having a floor and sides, and wherein said ends of said straps are adapted to be attached to the floor and one side of the structure.

21. A net according to claim 13 wherein at least some of said straps are interrupted to form opposed interrupted ends, and further comprising releasable link members for selectively joining said interrupted ends.

22. A net adapted to be attached to a structure comprising a plurality of straps, each of said straps having ends; and a bracket member attached to a plurality of said ends; each said bracket member including a plate assembly adapted to be attached to the structure, and a pivot member carrying a said end of a said strap, said pivot member being moveable relative to said plate assembly to allow said end of said strap to be removed from said pivot member.

23. A net according to claim 22 wherein said plate assembly includes a generally U-shaped plate member having a base adapted to be attached to the structure, and spaced opposed branches extending therefrom.

24. A net according to claim 23 wherein said pivot member is attached to and extends between said branches whereby upon detaching said pivot member from one said branch, said pivot member may be rotated so that said end of said strap can be removed from said pivot member.

25. A net according to claim 23, said plate member including two spaced generally U-shaped plates, said pivot member being positioned in the space between said U-shaped plates and between opposed branches thereof.

26. A net according to claim 22, the structure having a top and sides, and wherein said ends of said straps are adapted to be attached to the top and one side of the structure.

27. A net according to claim 22 wherein at least some of said straps are interrupted to form opposed interrupted ends, and further comprising releasable link members for selectively joining said interrupted ends.

28. A net comprising a plurality of straps, at least some of said straps being interrupted to form opposed interrupted ends, and a releasable link member for selectively joining said interrupted ends, said link member including a generally U-shaped body having opposed spaced arms, said opposed arms being adapted to carry said interrupted ends, and a spring carried by one of said arms such that in a relaxed position, said spring member extends outwardly from said body.

29. A net according to claim 28, said spring being selectively attachable to the other of said arms to selectively close the space between said arms.

30. A net according to claim 28, said spring being a continuous spring steel spring having first and second ends received in said one of said arms.

31. A net according to claim 30, said spring including first and second spaced curved portions, said first curved portion extending at one end from said first end, said second curved portion extending at one end from said second end, the other ends of said first and second curved portions being joined to form a latch section.

32. A net according to claim 31 wherein a latch hook is formed in the other of said arms to engage said latch section of said spring.

33. A net according to claim 32 wherein said curved portions may be squeezed toward each other to release said latch section from said latch hook.

34. A net adapted to be attached to a structure comprising first spaced straps having ends, second spaced straps having ends, at least some of said straps being interrupted to form opposed interrupted ends, said first and second straps intersecting at a plurality of angles relative to each other at a plurality of intersections; a stitching pattern applied to said straps at said intersections to connect said first and second straps, said stitching pattern including a plurality of stitch lines oriented such that at least one of said lines of stitches will be approximately normal to the direction of any force applied to any of said intersections; a hook assembly attached to a plurality of said ends; each said hook assembly including a hook member adapted to be attached to the structure, and a slide member carrying a said end of a said strap, said slide member being moveable relative to said hook member to allow said end of said strap to be removed from said slide member; a bracket member attached to a plurality of said straps; each said bracket member including a plate assembly adapted to be attached to the structure, and a pivot member carrying a said end of a said strap, said pivot member being moveable relative to said plate assembly to allow said end of said strap to be removed from said pivot member; and a releasable link member for selectively joining said interrupted ends.

* * * * *